(12) United States Patent
Pichardo Ramirez et al.

(10) Patent No.: US 9,963,050 B2
(45) Date of Patent: May 8, 2018

(54) MANUAL SEAT HEIGHT ADJUSTER MECHANISM

(71) Applicant: FORD GLOBAL TECHNOLOGIES, LLC, Dearborn, MI (US)

(72) Inventors: Mario Miguel Pichardo Ramirez, San Antonio La Isla (MX); Diego Santillan Gutierrez, Tizayuca (MX); Mario Garcia Lannoy, Toluca (MX)

(73) Assignee: Ford Global Technologies LLC, Dearborn, MI (US)

(*) Notice: Subject to any disclaimer, the term of this patent is extended or adjusted under 35 U.S.C. 154(b) by 148 days.

(21) Appl. No.: 15/053,717

(22) Filed: Feb. 25, 2016

(65) Prior Publication Data

US 2017/0246967 A1   Aug. 31, 2017

(51) Int. Cl.
*B60N 2/16* (2006.01)
*B60N 2/18* (2006.01)

(52) U.S. Cl.
CPC .......... *B60N 2/1655* (2013.01); *B60N 2/166* (2013.01); *B60N 2/18* (2013.01)

(58) Field of Classification Search
None
See application file for complete search history.

(56) References Cited

U.S. PATENT DOCUMENTS

| | | | |
|---|---|---|---|
| 4,488,699 A | 12/1984 | Chevalier | |
| 4,568,053 A * | 2/1986 | Strowik | B60N 2/0232 248/396 |
| 4,743,066 A | 5/1988 | Boisset et al. | |
| 6,158,811 A * | 12/2000 | Hofschulte | B60N 2/0224 297/330 |
| 8,851,570 B2 * | 10/2014 | Fujihara | B60N 2/1615 297/344.15 |
| 2015/0000444 A1 | 1/2015 | Schmidt et al. | |

FOREIGN PATENT DOCUMENTS

| | | |
|---|---|---|
| CN | 101553380 A | 10/2009 |
| DE | 1929412 B2 | 4/1978 |
| EP | 197638 A2 | 10/1986 |
| JP | 2015089779 A | 5/2015 |
| WO | 2002085664 A2 | 10/2002 |

OTHER PUBLICATIONS

English machine translation of CN101553380A.
English machine translation of DE1929412B2.
English machine translation of JP2015089779A.

* cited by examiner

*Primary Examiner* — David E Allred
(74) *Attorney, Agent, or Firm* — Vichit Chea; King & Schickli PLLC

(57) ABSTRACT

A manually operated seat height adjustment actuator mechanism includes a rotatory actuator-driven torque input mechanism defining a first axis and a torque output mechanism defining a second axis offset from the first axis. The rotatory actuator-driven torque input mechanism is provided by a planetary gear assembly. The torque output mechanism comprises a cycloidal drive assembly including eccentrically driven gears. Linking gearing operatively links the torque input mechanism and the torque output mechanism. The eccentrically driven gears engage an output pinion configured to engage a gear segment of a seat height adjustment mechanism for raising and lowering a seat.

14 Claims, 5 Drawing Sheets ated seat height adjustment actuator mechanism is described, including a rotatory actuator-driven torque input mechanism defining a first axis and a torque output mechanism defining a second axis offset from the first axis. Linking gearing operatively links the torque input mechanism and the torque output mechanism.

MANUAL SEAT HEIGHT ADJUSTER MECHANISM

TECHNICAL FIELD

This disclosure relates generally to vehicle seat height adjustment mechanisms. More particularly, the disclosure relates to a manually operated seat height adjustment actuator mechanism requiring reduced user effort for raising or lowering a seat height.

BACKGROUND

As is known, vehicle seats comprise a seat back portion and a seat bottom portion, and are typically configured for adjustment to accommodate a seat occupant's particular dimensions. The entire seat structure can be translated in a vehicle fore-and-aft direction to accommodate the seat occupant's leg and arm length. Likewise, the seat back portion may be tilted in a vehicle fore and aft direction according to user preference. Still more, vehicle seats are typically provided with a mechanism for adjusting a height of the vehicle seat to accommodate the seat occupant's leg length. Such mechanisms may be provided as motorized or manual systems.

Manual seat height adjustment mechanisms, while advantageous in terms of cost of manufacture and lesser complexity compared to motorized systems, disadvantageously often require increased user effort to operate. Commonly, lever-driven mechanisms are used to attempt to reduce the user effort needed to raise or lower a seat to a desired height. Levers, while substantially effective for their intended purpose, require additional packaging considerations relating to needed space for the lever to be positioned, accessed, and actuated, and may be difficult for a user to find.

To solve these and other problems, the present disclosure describes a manual seat height adjustment actuator mechanism comprising an epicycloid gear transmission having eccentric gearing. Advantageously, the described mechanism reduces the user effort necessary to provide sufficient torque to drive the mechanism, thus reducing user fatigue and improving user comfort and satisfaction.

SUMMARY

In one aspect of the present disclosure, a manually operated seat height adjustment actuator mechanism is described, including a rotatory actuator-driven torque input mechanism defining a first axis and a torque output mechanism defining a second axis offset from the first axis. Linking gearing operatively links the torque input mechanism and the torque output mechanism.

In embodiments, the rotatory actuator-driven torque input mechanism comprises a planetary gear assembly including a ring gear, cooperating sets of orbiting planetary gears engaging the ring gear and a common sun gear, and an output driver driven by a one of the cooperating sets of orbiting planetary gears and configured to drive the linking gearing. In an embodiment, the linking gearing is defined by transversely oriented bevel gears configured to drive the torque output mechanism.

In embodiments, the torque output mechanism comprises a worm gear driving eccentric pins and a cycloidal drive assembly comprising a pair of eccentrically driven gears engaged by the eccentric pins. The eccentrically driven gears engage and drive an output pinion configured to engage a gear segment operatively linked to a seat height adjustment mechanism.

In another aspect, a manually operated seat height adjustment actuator mechanism is described, comprising a torque input mechanism comprising a planetary gear assembly and defining a first axis and a torque output mechanism comprising a cycloidal drive assembly and defining a second axis offset from the first axis. Linking gearing is provided operatively linking the torque input mechanism and the torque output mechanism.

In embodiments, the planetary gear assembly comprises a rotatory actuator defining an interior ring gear and at least one set of orbiting planetary gears engaging the ring gear and a common sun gear. An output driver driven by the at least one set of orbiting planetary gears is provided, configured to drive the linking gearing. In embodiments, the linking gearing comprises transversely oriented bevel gears configured to drive the torque output mechanism.

In embodiments, the torque output mechanism comprises a worm gear driving eccentric pins and at least one eccentrically driven gear engaged by the eccentric pins. The at least one eccentrically driven gear engages and drives an output pinion configured to engage a gear segment operatively linked to a seat height adjustment mechanism.

In yet another aspect, an adjustable vehicle seat assembly is described, including a seat defined by at least a back portion and a bottom portion. The seat assembly includes a manually operated seat height adjustment actuator mechanism as described above.

In the following description, there are shown and described embodiments of the disclosed manual seat height adjustment actuator mechanism. As it should be realized, the mechanisms are capable of other, different embodiments and their several details are capable of modification in various, obvious aspects all without departing from the devices as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed manual seat height adjustment actuator mechanism and together with the description serve to explain certain principles thereof. In the drawings.

Reference will now be made in detail to embodiments of the disclosed manual seat height adjuster actuator mechanism, examples of which are illustrated in the accompanying drawing figures.

DETAILED DESCRIPTION

Figure 1:
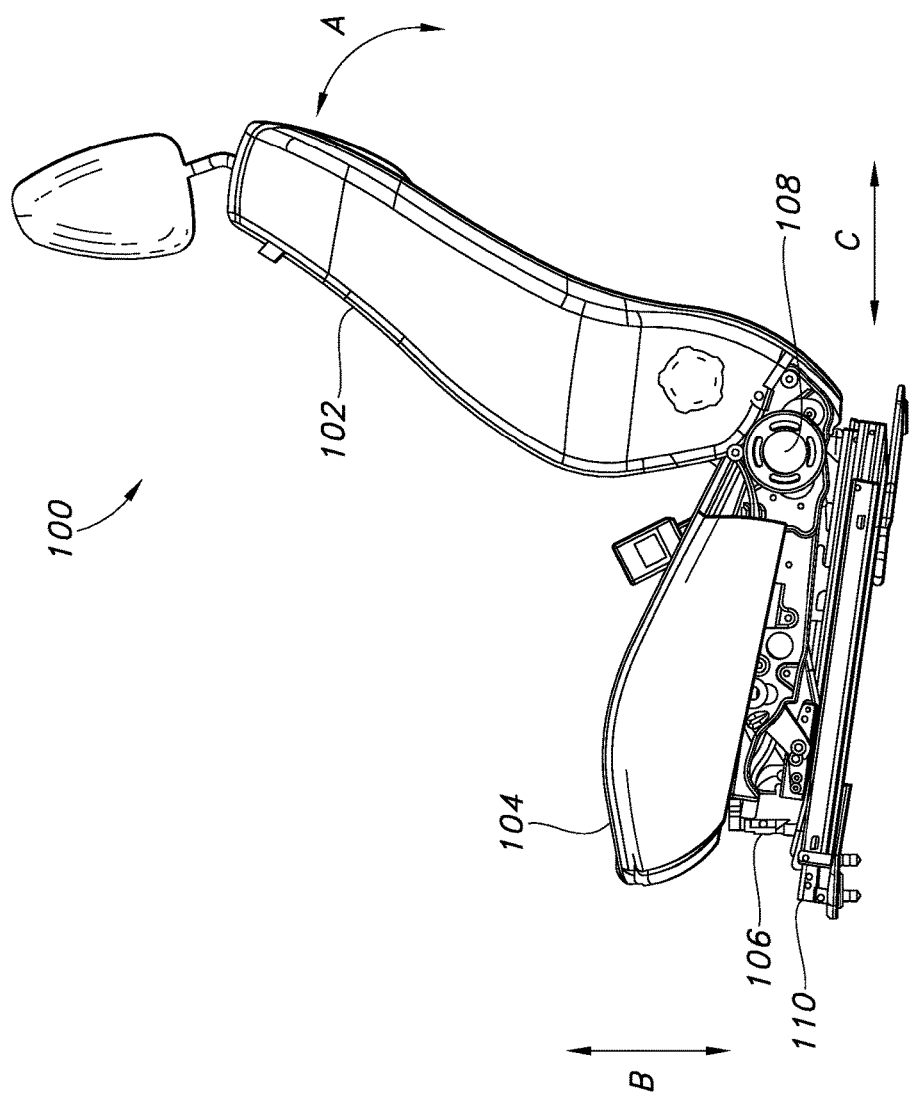
FIG. 1 depicts a vehicle seat assembly.

FIG. 1 shows a representative vehicle seat 100 structure, including a seat back portion 102, a seat bottom portion 104, and a seat substructure 106. As summarized above, the seat back portion 102 is configured to pivot in a vehicle fore-and-aft direction (arrow A), while the seat bottom portion 104 is configured to displace vertically (arrow B) to adjust a height of the seat. As depicted, the seat 100 is provided with a manual seat height adjuster mechanism (not visible in this view) associated with the seat substructure 106, including an actuator mechanism (not visible in this view) manually operable by a seat 100 occupant by way of a rotatory actuator 108. The seat 100 is also adjustable in a vehicle fore-and-aft direction by way of sliding tracks 110 (arrow C).

Figure 2:
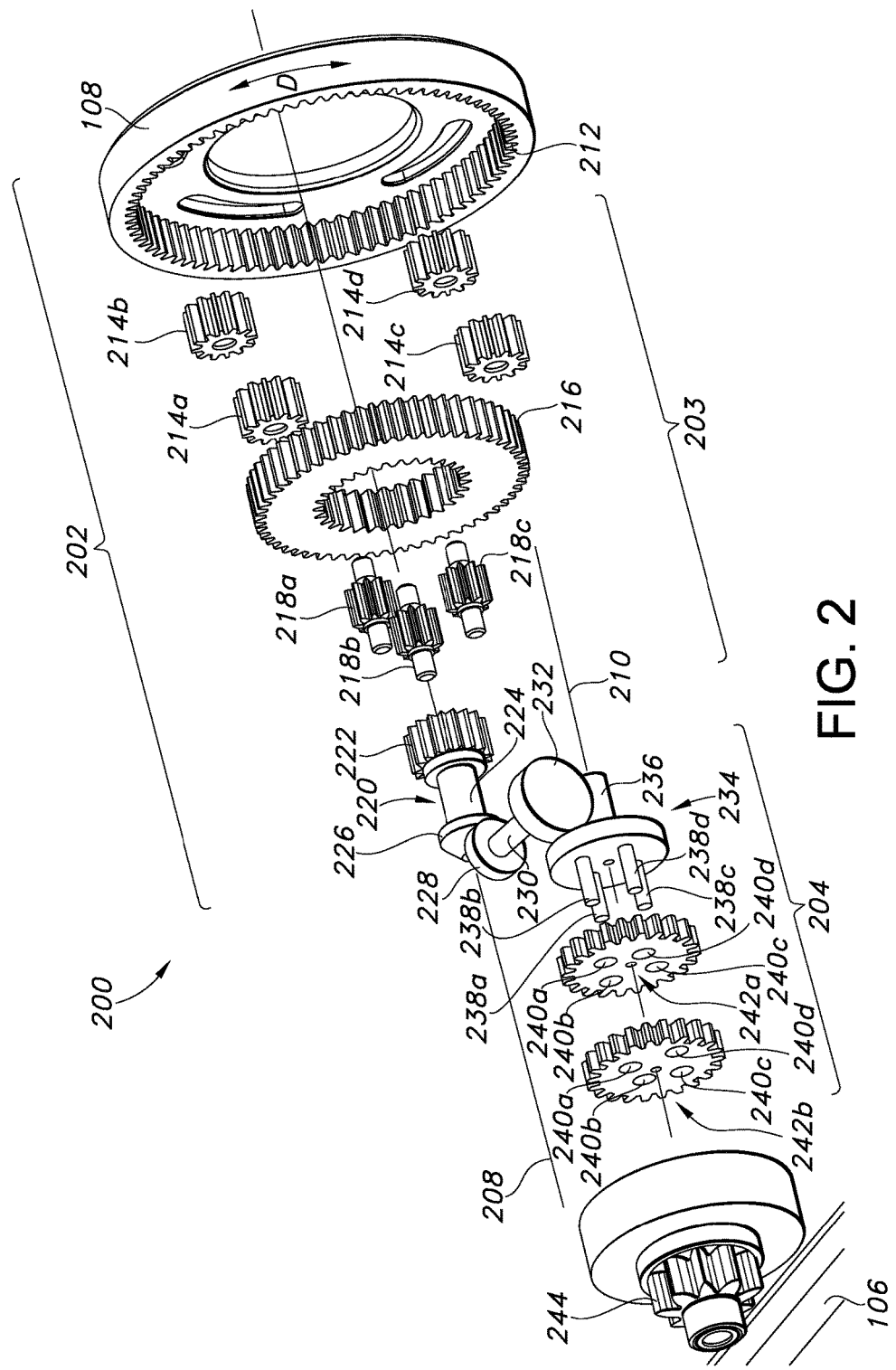
FIG. 2 shows an exploded view of a manual seat height adjuster actuator mechanism according to the present disclosure.

FIG. 2 depicts an exploded view of a manually operable actuator mechanism 200 for a seat height adjuster mechanism (not visible in this view) associated with the seat substructure 106 and actuable by the rotatory (see arrow D) actuator 108. At a high level, the actuator mechanism includes a torque input mechanism 202, a torque output mechanism 204, and linking gearing 206 operatively linking the torque input and output mechanisms. As shown, the torque input mechanism 202 is configured along a first longitudinal axis 208 and the torque output mechanism 204 is configured along a second longitudinal axis 210. Axis 208 is offset relative to axis 210. The linking gearing 206 transversely bridges the offset between the two longitudinal axes 208, 210.

In the depicted embodiment, the torque input mechanism 202 includes the rotatory actuator 108 and a planetary gear assembly 203. The rotatory actuator 108 comprises an internal ring gear 212 which engages a first set of orbiting planetary gears 214a, 214b, 214c, 214d. The orbiting planetary gears 214a, 214b, 214c, 214d engage exterior teeth of a sun gear 216, which in turn comprises interior teeth which engage a second set of orbiting planetary gears 218a, 218b, 218c. Of course, the skilled artisan will appreciate that more or fewer orbiting planetary gears could be used to engage either or both of the exterior teeth and interior teeth of the common sun gear 216, in accordance with the dimensions of the various components, the amount of torque increase to be imparted by rotating the rotatory actuator 108, etc. The planetary gear assembly further includes an output driver 220 including a gear 222 driven by orbiting planetary gears 218a, 218b, 218c, an axle 224, and a bevel gear 226.

The linking gearing 206 comprises a cooperating bevel gear 228 which meshes with bevel gear 226, an axle 230, and a gear 232 which drives a portion of the torque output mechanism 204 as will be described. As depicted, the linking gearing 206 defines a longitudinal axis oriented transversely to a longitudinal axis defined by the output driver 220. This provides the described offset between the longitudinal axes 208, 210 of the torque input mechanism 202 and the torque output mechanism 204.

The torque output mechanism 204 in the depicted embodiment is provided as a cycloidal drive or epicycloidal transmission including a worm wheel 234 comprising a worm gear 236 which drives a plurality of eccentric pins 328a, 238b, 238c, 238d. The eccentric pins engage cooperating apertures 240a, 240b, 240c, 240d formed in a pair of eccentrically driven gears 242a, 242b. As is known for such epicycloid drives, apertures 240a, 240b, 240c, 240d define a larger interior circumference compared to an exterior cross-sectional diameter of eccentric pins 328a, 238b, 238c, 238d. Thus, when the worm wheel 234 rotates, the eccentric pins 232a, 232b, 232c, 232d engaging apertures 234a, 234b, 234c, 234d of gears 236a, 236b drive those gears eccentrically. In turn, the eccentric gears 242a, 242b engage and drive an output pinion 244, which as will be described actuates a seat height adjusting mechanism.

Figure 3:
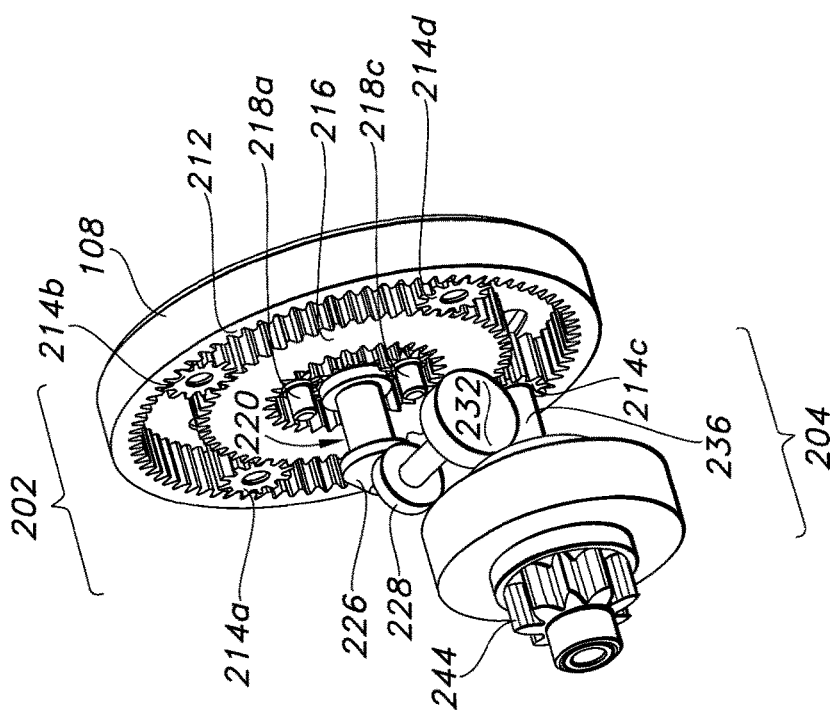
FIG. 3 shows an assembled view of the manual seat height adjuster actuator mechanism of FIG. 2.

The assembled torque input mechanism 202 and torque output mechanism 204 are shown in FIG. 3. As can be seen, an efficient and compact actuator mechanism is provided.

Figure 4:
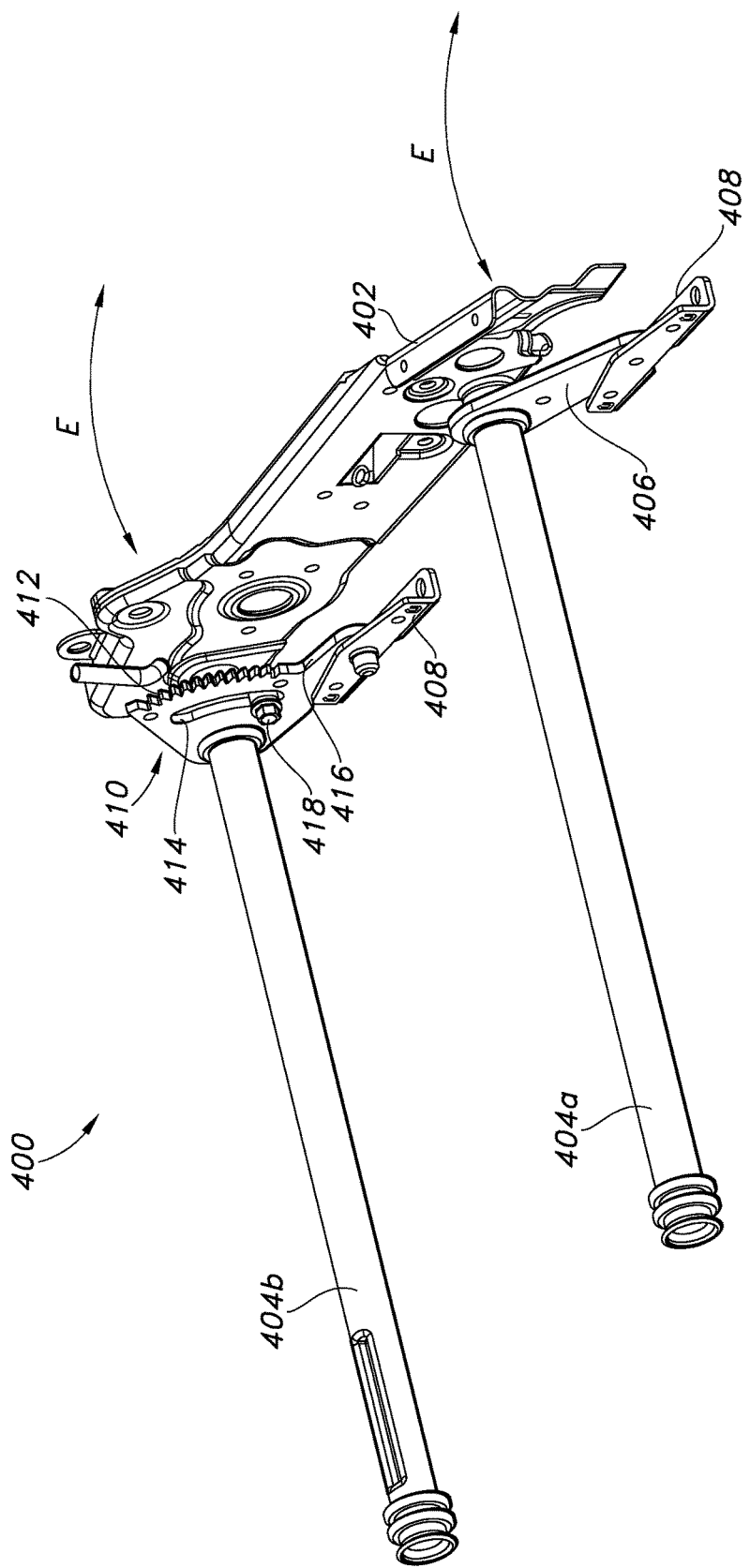
FIG. 4 shows an embodiment of a seat height adjuster mechanism.

FIG. 4 shows a portion of a seat height actuator mechanism 400. The mechanism 400 includes a vertically translatable frame include opposed side frame members 402 (only one side frame member is shown for convenience) and transverse frame members 404. As will be appreciated, the side frame members 402 and transverse frame members 404a, 404b support a portion of the seat substructure 106 (not shown in this view), the seat cushion (not shown) etc.

Each opposed end of transverse frame member 404a is rotatably mounted to a first end of side frame members 402. In turn, a strut 406 pivotally secures the transverse frame member 404a to a floor mounted bracket 408. The transverse frame member 404b is likewise pivotally mounted to an opposed end of side frame members 402. The transverse frame member 404b is also rotatably mounted to a gear segment 410 including a gear tooth portion 412, a guide slot 414, and a strut portion 416. The strut portion 416 is pivotally attached to another floor-mounted bracket 408. A guide pin 418 associated with side frame member 402 engages guide slot 414 to guide and stabilize the path of travel of gear segment 410. As will be described below, actuating the above-described mechanism moves the gear segment 410 in an arcuately vertical path of travel, raising or lowering (arrows E) the side frame members 402 and transverse frame members 404a, 404b, thus raising or lowering a seat assembly held thereby.

Figure 5:
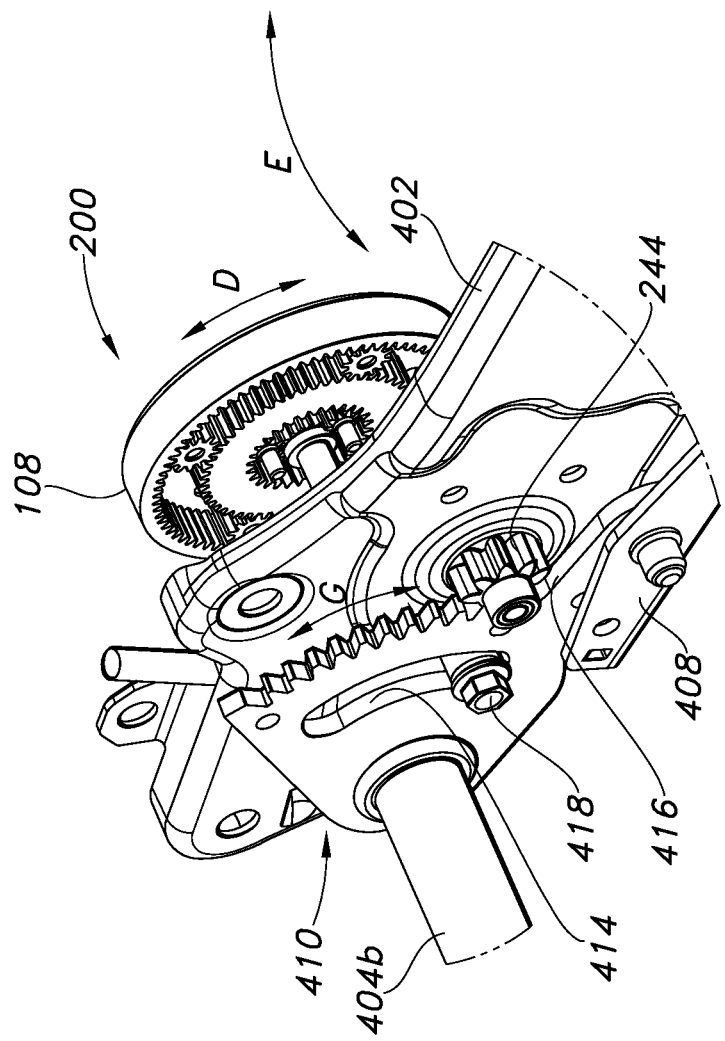
FIG. 5 shows the actuator mechanism of FIG. 3 assembled to the height adjuster mechanism of FIG. 4.

FIG. 5 shows the manually operable actuator mechanism 200 assembled to the seat height actuator mechanism 400. As shown, when assembled the output pinion 244 engages the gear segment gear tooth portion 412. Thus, rotating the rotatory actuator 108 (arrow D) causes rotation of the output pinion 252 (arrow F), which in turn causes the gear segment 410 to move in an arcuately vertical path of travel (arrow G), raising or lowering the side frame member 402 and transverse frame member 404b as described (arrow E).

Accordingly, by the foregoing description an effective, compact, and efficient manual actuator mechanism for a seat height adjustment mechanism is provided. Advantageously, by the use of the described torque input mechanism including a planetary gear assembly and torque output mechanism including an epicycloid gear transmission, minimal operator effort in actuating the actuator mechanism provides significant output torque, and so efficiency of manual operation of the seat height adjuster is maximized. In particular, as will be appreciated the described torque input mechanism 202 and offset torque output mechanism 204 increase torque by use of the described planetary gear assembly 203 driving eccentric gearing 242a, 242b which in turn drives an output pinion 244 as described. Moreover, the mechanism provides a self-locking transmission between the worm wheel 234 by use of offsetting linking gearing 206 as described. Thus, the force of a load applied by an occupant occupying the seat bottom 104 does not cause the mechanism to operate in reverse, altering a seat height set by that occupant.

Obvious modifications and variations are possible in light of the above teachings. All such modifications and variations are within the scope of the appended claims when interpreted in accordance with the breadth to which they are fairly, legally and equitably entitled.

What is claimed:

1. A manually operated seat height adjustment actuator mechanism, comprising:
   a rotatory actuator-driven torque input mechanism comprising a planetary gear assembly defining a first axis;

a torque output mechanism comprising a worm gear driving eccentric pins engaging a cycloidal drive assembly comprising at least one eccentrically driven gear engaged by the pins, the torque output mechanism defining a second axis that is offset from and parallel to the first axis; and linking gearing operatively linking the torque input mechanism and the torque output mechanism.

2. The mechanism of claim 1, wherein the planetary gear assembly comprises:

a ring gear;

cooperating sets of orbiting planetary gears engaging the ring gear and a common sun gear; and an output driver driven by a one of the cooperating sets of orbiting planetary gears and configured to drive the linking gearing.

3. The mechanism of claim 2, wherein the linking gearing comprises transversely oriented bevel gears configured to drive the torque output mechanism.

4. The mechanism of claim 3, wherein the torque output mechanism comprises a worm gear driving eccentric pins.

5. The mechanism of claim 4, wherein the cycloidal drive assembly comprises a pair of eccentrically driven gears, including the at least one eccentrically driven gear.

6. The mechanism of claim 5, wherein the eccentrically driven gears engage an output pinion configured to engage a gear segment operatively linked to a seat height adjustment mechanism.

7. A vehicle seat including the mechanism of claim 1.

8. An adjustable vehicle seat assembly, comprising:

a seat defined by at least a back portion and a bottom portion; and a manually operated seat height adjustment actuator mechanism, comprising:

a rotatory actuator-driven torque input mechanism comprising a planetary gear assembly defining a first axis;

a torque output mechanism comprising a worm gear driving eccentric pins engaging a cycloidal drive assembly comprising at least one eccentrically driven gear engaged by the pins, the torque output mechanism defining a second axis that is offset from and parallel to the first axis; and linking gearing operatively linking the torque input mechanism and the offset torque output mechanism.

9. The assembly of claim 8, wherein the planetary gear assembly comprises:

a ring gear;

cooperating sets of orbiting planetary gears engaging the ring gear and a common sun gear; and an output driver driven by a one of the cooperating sets of orbiting planetary gears and configured to drive the linking gearing.

10. The assembly of claim 9, wherein the linking gearing comprises transversely oriented bevel gears configured to drive the torque output mechanism.

11. The assembly of claim 10, wherein the torque output mechanism comprises a worm gear driving eccentric pins.

12. The assembly of claim 10, wherein the cycloidal drive assembly comprises a pair of eccentrically driven gears, including the at least one eccentrically driven gear.

13. The assembly of claim 12, wherein the eccentrically driven gears engage an output pinion configured to engage a gear segment operatively linked to a seat height adjustment mechanism disposed within the seat.

14. A vehicle including the assembly of claim 7.

* * * * *